United States Patent [19]

Hoffman

[11] Patent Number: 5,139,804
[45] Date of Patent: Aug. 18, 1992

[54] PATTERNED ADHERENT FILM STRUCTURES AND PROCESS FOR MAKING

[75] Inventor: Kenneth Hoffman, Columbus, Ga.

[73] Assignee: Plicon, Inc., Columbus, Ga.

[21] Appl. No.: 414,457

[22] Filed: Sep. 29, 1989

Related U.S. Application Data

[62] Division of Ser. No. 50,057, May 14, 1987.

[51] Int. Cl.⁵ .............................................. B65B 53/00
[52] U.S. Cl. .................................... 426/412; 426/106; 426/112; 426/129
[58] Field of Search ............... 426/412, 112, 415, 106, 426/129; 264/293, 282; 425/385

[56] References Cited

U.S. PATENT DOCUMENTS

| | | | |
|---|---|---|---|
| 3,549,381 | 12/1970 | Kinsinger | 426/394 |
| 3,784,711 | 1/1974 | Kane | 426/130 |
| 4,264,672 | 4/1981 | Taylor-Brown et al. | 264/321 |
| 4,411,919 | 10/1983 | Thompson | 426/412 |

*Primary Examiner*—Donald E. Czaja
*Assistant Examiner*—Tony Weier
*Attorney, Agent, or Firm*—Hill, Van Santen, Steadman & Simpson

[57] ABSTRACT

Plastic web materials are provided which are selectively treated in a patterned manner with corona discharge. Methods for making and using such webs are provided. In one aspect, such a web is utilized as the inside surface of a container structure. During meat cook-in, such structure selectively in treated areas adhere to highly proteinaceous material cooked therein.

5 Claims, 2 Drawing Sheets

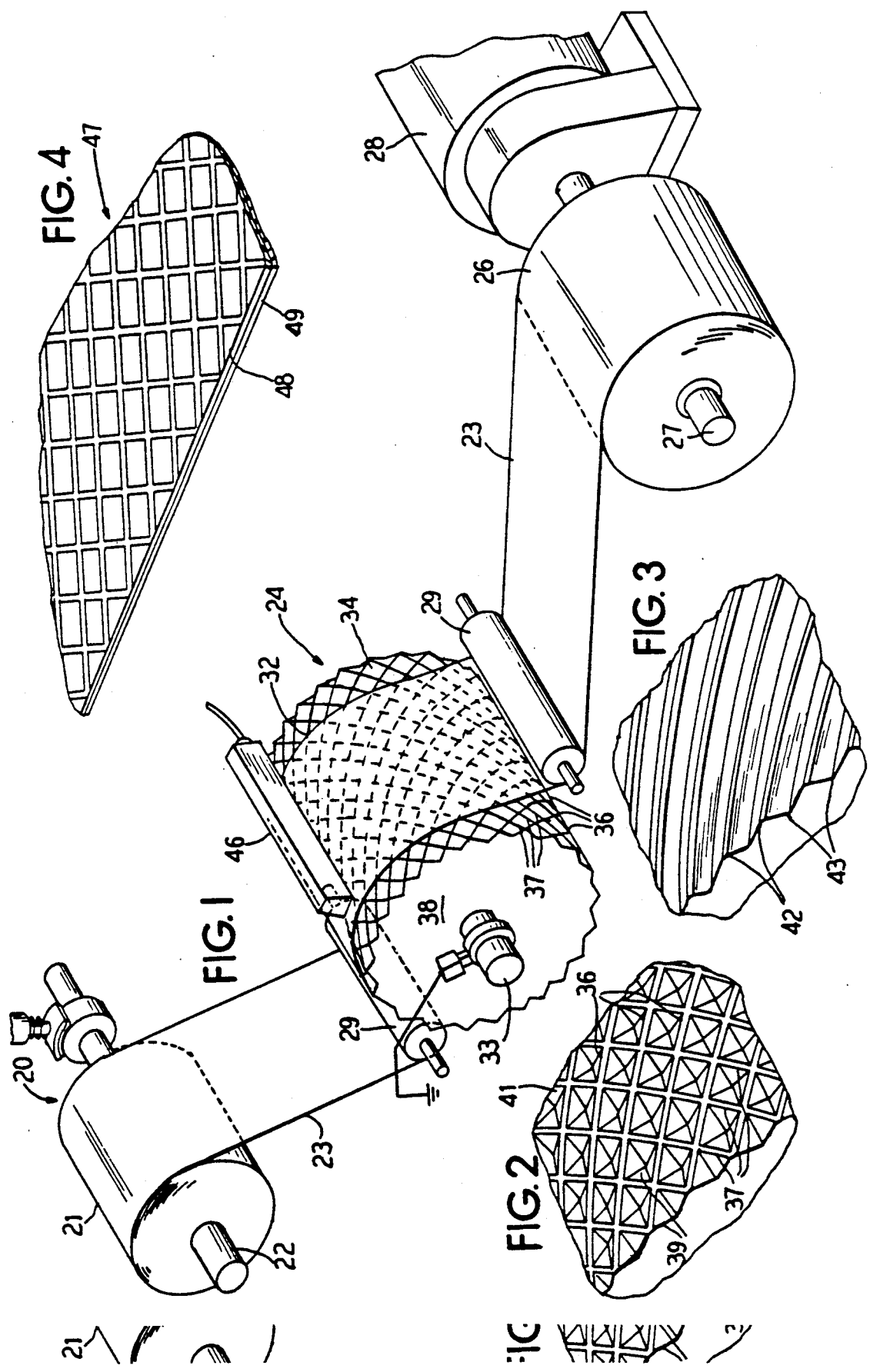

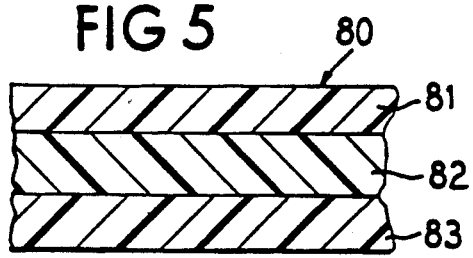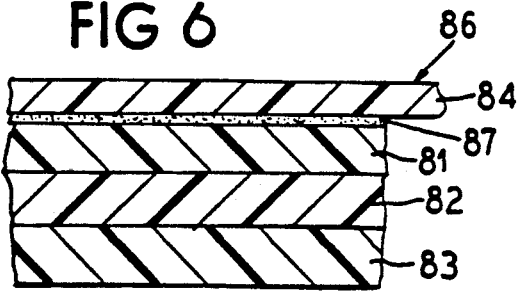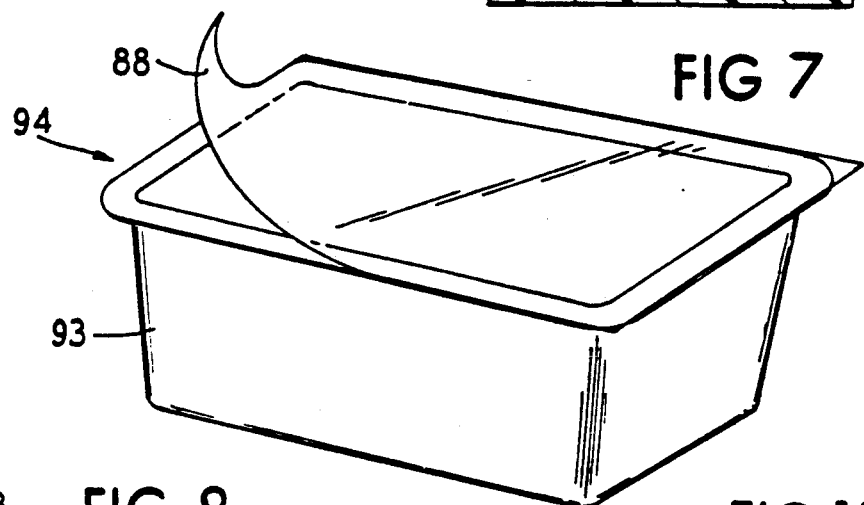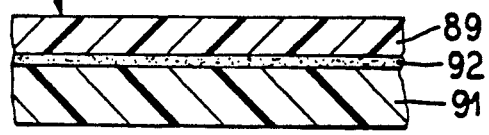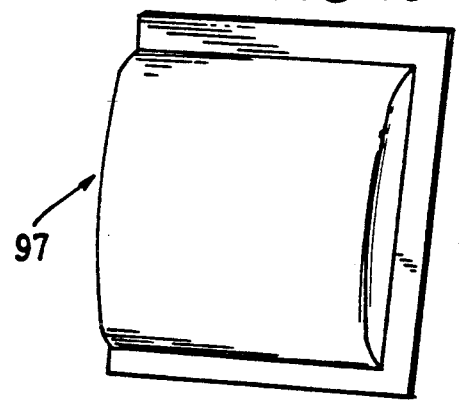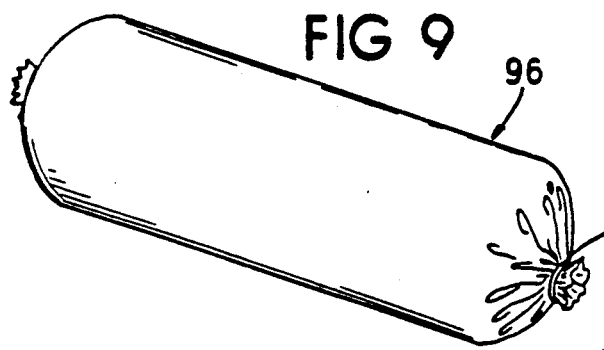

PATTERNED ADHERENT FILM STRUCTURES AND PROCESS FOR MAKING

This is a division of application Ser. No. 050,057 filed May 14, 1987.

BACKGROUND OF THE INVENTION

1. Field of the Invention

This invention lies in the field of surface treated plastic web members (including films and laminates), particularly such structures which have a pattern created in surface portions thereof which is achieved as a direct result of charge treatment.

2. Prior Art

To enhance yields of a cook-in packaged meat product and particularly so as to minimize and even substantially prevent cook-out of fluids from meat package in a plastic container wherein the meat is cooked, it has been heretofore appreciated that a flexible plastic container can be used which is conformable to the meat product contained therein and whose inside wall portions are meat adherent during cook-in. The container itself can either be of the stuffable type wherein meat is initially compacted against the walls of a somewhat resilient container member such as a casing or the like or the container employed displays heat shrinkable characteristics such that the container particularly at cook temperatures displays a capacity to heat shrink, thereby bringing the container in its sealed configuration into a close conforming condition relative to the meat contained therein so that meat configuration changes during the cook-in process are compensated for by the container shrink characteristics during cooking.

For example, Thompson U.S. Pat. No. 4,411,919 describes the cook-in of packaged meat using an energetic radiation treated, meat adherent inner container surface comprised of a polymeric olefin, while Schirmer U.S. Pat. No. 4,606,922 teaches the use of an irradiation treated ionomer layer as the meat adherent inside surface for a meat cook-in container.

Such meat adhering cook-in packaging techniques, particularly in certain use circumstances, display certain disadvantages. For one thing, when the meat package utilizes meat having a retained skin, such as turkey or other poultry meat, the meat adherent interior surface can be so aggressively adherent to the skin as to result in undesirable delamination and separation of the skin from the cooked meat at the time when the package is removed from the meat following cook-in. Thus, even though the problem of purge or cook-out of fluids has been overcome, the resulting separation of skin from meat is considered to be commercially disadvantageous.

Another problem in the cook-in packaging art involving a plastic container lies in the circumstance that it is difficult, and apparently in some cases apparently presently impossible, to correlate the amount of irradiation or corona treatment or even ozone treatment uniformly given to a plastic surface with the subsequent degree of meat or other high protein material adherence thereto. In other words, the degree or extent of meat adherence, at the present time, does not appear to be regulatable by the amount of uniform surface treatment which is preliminarily given to the meat contacting surface portions of the intended cook-in container to be used for meat processing (preferably without purge).

Another problem in the cook-in packaging art is that uniform surface treatment of the intended interior surface portions of a cook-in container, which treatment is carried out for the purpose of improving the capacity of highly proteinaceous foods to adhere thereto, appears to detract from the ability of the treated surface to adhere by heat sealing to similarly treated surfaces of plastics having even an identical composition. This is important because filled cook-in plastic containers are typically sealed before being exposed to cooking temperatures by heat sealing adjacent inner wall surface portions together. Since steam pressures within the sealed container can develop, for example, in the cooking of beef at about 200° F., unless durable container seals are formed, they tend to open during cooking with undesirable effects. Where the interior surface portions are treated with corona discharge, gamma radiation, ozone, etc., slight alteration in treated surface composition results. The chemical nature of this alteration is not known, but is believed to involve at least some oxidation (perhaps partially oxidized) surfaces brought together and heat sealed, the resulting seal tends to be weaker than a corresponding seal formed between untreated surfaces. This effect thus presents a problem in providing containers for cook-in of meat and other highly proteinaceous foods when the container inside walls are to be adherent to such foods in order to achieve, for example, a purgefree cooked-in product package.

There is a need in the art for new and improved meat adherent surfaces for use in containers adapted for employment in the cook-in meat packaging field.

BRIEF SUMMARY OF THE INVENTION

More particularly, the present invention relates to plastic materials which have been differentially (selectively) treated in a patterned manner with corona discharge, and to methods for making and using the same, and to articles of manufacture resulting therefrom.

In one aspect, the present invention relates to a web of plastic wherein one surface layer thereof has been subjected to selective pattern of corona discharge treatment such that the face of one surface of the web has a pattern therein. This pattern is characterized by selective corona discharge treatment in some areas. Preferably, the pattern has relatively small repeating units. One preferred pattern has a pattern unit wherein the central region thereof is treated while the border or perimeter regions thereof are substantially untreated. This aspect of the invention further includes methods for achieving such selectively patterned corona discharge treatment.

In another aspect, the present invention relates to container structures adapted for meat (or other highly proteinaceous food) adhering cook-in packaging such that cooking of such may be accomplished with substantially no cook-out of fluids from the meat or other highly proteinaceous material (i.e., without purge). The containers can be of the non-formable or formable type.

In another aspect, the present invention relates to packaged meat (or other highly proteinaceous food) wherein such food has been cooked in the package, wherein purge has been minimized or eliminated, and wherein such food can be removed from the package with little loss of such food through adherence thereof to interior container walls and the like.

In another aspect, the present invention enables one to obtain an improved heat seal between contacting surfaces of heat sealable untreated plastic materials, particularly where the contacting surfaces are each comprised of approximately the same plastic material and are adapted to form inside wall portions of a container. For example, in the case of prior art plastic containers of the type where the container is conventionally sealed shut by heat sealing together the inside uniformly corona discharge treated surface portions of the container at the mouth or lip region, it is common to experience seal failure problems, particularly when the resulting sealed container is subjected to elevated temperatures, high shrink rates, and, in some cases, elevated pressures, sufficient to permit cook-in of a highly proteinaceous food fill in the sealed container. Such inside surface portions which are so sealed together have been previously uniformly treated with corona discharge or the like to alter and improve inner surface characteristics as regards protein (e.g., meat and the like) adherency capabilities. As indicated above, such a prior art treatment can cause seal failures during the cooking because of weaker seal bonds being formed between the sealed surfaces compared to corresponding bond strengths achieved between untreated but sealed corresponding surfaces.

However, in contrast to the prior art, when the respective contacting surfaces being heat sealed together are each comprised, for example, of the same or similar plastic materials which have been selectively surface treated with corona discharge in accord with the present invention so as to have associated therewith a selective treatment pattern, then improved heat seals are obtained which display improved over-all bond strengths. The selective surface treatment variations (corresponding to the treatment pattern) are such that areas of non-treatment in one surface align with areas of non-treatment in the adjacent contacting surface intermittently along the length of an elongated seal region formed by heat sealing. The configurations associated with a treatment pattern can be used to enhance the increased bond strengths achieved in the heat sealed regions.

In another aspect, the present invention enables one to prepare an improved package of the type wherein a highly proteinaceous material, such as meat (including poultry and fish), eggs, cheese, and the like, has been cooked in a sealed plastic container, and wherein the inside surface portions of such container are adherent to such highly proteinaceous material. In accordance with this invention, such inside surface portions of the cook-in container are comprised of a layer of a plastic material which has been selectively surface treated with corona discharge or the like so as to have associated therewith a desired treatment pattern. When such a container is opened after cooking, and container wall portions are separated from the highly proteinaceous material, it is found that the breaks (changes) in the treated areas relative to the untreated areas cause less of the highly proteinaceous material to be broken, or separated away from, the main body portions of such highly proteinaceous material than is typically found to exist when the container involved is one of the prior art type where the inside wall surface portions thereof have been uniformly treated with corona discharge or the like. Thus, when separation or delamination of cooked-in highly proteinaceous material from adherent adjacent container wall portions is accomplished, the non-uniform adherence pattern results in less highly proteinaceous material being pulled away from, and, in effect, thereby wasted, relative to the main body of highly proteinaceous material. Evidently, the highly treated areas with selective treatment pattern are apparently interrupted by non-treated or only slightly treated areas. This interruption acts in effect as a mechanism to encourage a maximum release of highly proteinaceous material from the selectively treated patterned surface areas in contrast to the situation existing in the prior art where uniformly treated surfaces seem virtually to encourage excessive separation and wastage of cooked-in highly proteinaceous material.

The invention thus overcomes disadvantages of the prior art associated with uniformly adherent meat (high protein) packaging materials and makes possible the provision of cook-in meat (high protein) containers with improved seals which can be separated from highly proteinaceous foods cooked therein with minimal loss of such food.

Other and further objects aims, objects, purposes, features, advantages, embodiments, applications, and the like will be apparent to those skilled in the art and the teachings of the present invention taken with the accompanying drawings.

BRIEF DESCRIPTION OF THE DRAWINGS

In the drawings:

FIG. 1 is a perspective view of one embodiment of apparatus adapted for producing a selectively patterned corona discharge treated web member;

FIG. 2 is an enlarged fragmentary perspective view of one portion of the forming roll employed in the apparatus of FIG. 1;

FIG. 3 is a view similar to FIG. 2 but illustrating an alternative pattern for a forming roll;

FIG. 4 is a perspective view in enlarged format diagrammatically illustrating the nature of a web member which has been processed in the apparatus of FIG. 1 using a roller of the type shown in FIG. 1 and FIG. 2;

FIG. 5 presents in a fragmentary enlarged vertical sectional format one embodiment of a three layered coextruded laminate having a selective corona treated surface pattern in one surface layer thereof such as is produced by the embodiment of FIGS. 1 and 2;

FIG. 6 presents in a fragmentary enlarged vertical sectional format one embodiment of a formable web structure of the present invention utilizing the differentially (selectively) treated coextruded film of FIG. 5 in combination with another film member which is laminated thereto;

FIG. 7 is a perspective view of one embodiment of a container structure of the present invention wherein the tray portion thereof is formed from a web structure of FIG. 6;

FIG. 8 presents in a fragmentary enlarged vertical sectional format one embodiment of a non-formable web structure which is suitable for use as a lid material in the container structure of FIG. 7;

FIG. 9 is a perspective view of one embodiment of a (filled) non-formable container structure incorporating a selectively corona discharge treated web member in accordance with the present invention;

FIG. 10 is a view similar to FIG. 9 showing another such container structure; and FIG. 11 is a perspective view of an unfilled container structure of the type shown in FIGS. 9 and 10.

DETAILED DESCRIPTION

Referring to FIG. 1, there is seen an embodiment of apparatus suitable for making a selectively patterned corona discharge treated plastic web (including film) member of the present invention, such apparatus being designated herein in its entirety by the numeral 20. In apparatus 20, a supply roll 21 is journaled for rotational movements on a shaft 22 enabling a web 23 to be fed from the supply roll 21 to and through a treating zone 24 and ultimately to a take up roll 26 mounted on driven shaft 27 which is rotatedly driven by a conventional power train 28 (not detailed). A plurality of tensioning and guidance rollers 29 are provided for regulating passage of the web 23 through the treating zone 24.

In the treating zone 24, the web 23 is brought into contact with a portion of the circumferential surface of a roll 31 which wrapped portion or area is generally indicated for convenience herein by the numeral 32. Preferably, and as shown, such contacting portion 32 extends over about 180° of the circumferential surface 34 of the roll 31. Wrap angles generally in the range of from about 100° to 230° appear to be useful, but larger and smaller wrap angles can be employed without departing from the spirit and scope of the invention. In general, the wrap angle should be sufficient to eliminate undesirable back side treatment of the web being processed in areas thereof where the web contacts the roll. Such a wrap angle as provided appears to provide a better pattern definition in resulting webs treated in zone 24 than is achieved when smaller wrap angles are used. The applicator roll 31 is conveniently rotatably driven by a shaft 33 by a power head (not shown) such that the circumferential speed of the applicator roll 31 matches the travel speed of the web 23. Alternatively, if desired, the applicator roll 31 can be driven by the tension of the web 23 over circumferential surface portions 32 thereof.

The circumferential surface 34 of the roll 31 in the embodiment shown is formed of steel and has been previously precision engraved with a desired pattern. A present preference is to use a roll 31 having a surface 34 pattern characterized by the regular recurrence of a repeat design extending longitudinally and circumferentially thereover. In the presently preferred embodiment, as shown in FIGS. 1 and 2, this design is in the nature of a lenticular or diamond configured pattern, wherein the borders of individual diamonds are defined by raised or elevated ridges or bars which spirally extend over the circumferential surface 34 of roll 31, one set of the individual ridges 36 extending, in this illustration, generally in a clockwise spiral while another set of the individual ridges 37 extending generally perpendicularly to the individual ridges 36, but in a counterclockwise direction (when viewed, for example, from the end 38 of the applicator roll 31 as shown in FIG. 1). The respective diamond-shaped regions 39 thus defined between each pair of intersecting ridges 36 and 37 are depressed relative to the projecting circumferential surfaces of the respective ridges 36 and 37. In the embodiment shown in FIG. 2, for example, each region 39 has four generally triangularly configured side walls 40 which tapers to a common point 41 defining the maximum region depth for an individual depression 39; thus, each region 39 here has a pyramidal shape or cellular configuration.

Those skilled in the art will appreciate that such side walls 40 for a given region 39 can be configured for a given pattern so as to achieve or emphasize some particular desired type of treatment effect in a web member 23 processed to have a treated patterned surface produced by the practice of the present invention.

From the standpoint of producing a selectively patterned, surface-treated web of the present invention, the general design of the pattern does not appear to be critical, but rather the exact design for a given web is to some extent a matter for individual preference and costs. For example, the type of diamond-configured pattern structure shown in FIGS. 1 and 2 with regions 39 is similar to the type of structure associated with steel engraved applicator rolls such as are most generally used for light and medium application of color or coating on aniline printing machines where the color or coating is transferred from a fountain roll to the plate or coating roll without the use of a doctor blade. Such rolls are available, for example, from Modern Engraving and Machine Company, Hillside, N.J. In such a roll, the depth of the pyramid can range, for example, from about 0.05 to 0.0009 inches. The surface transverse width of a ridge 36 or 37 can vary from a knife-edge up to a flattened condition, such as a width ranging, for example, from about 0.001 to 0.05 inch. Other designs, dimensions, depths, etc. appear to be useful and are within the spirit and scope of the present invention. For example, a star configured, or circle configured pattern can be employed upon surface 34.

For another example, the design illustrated in FIG. 3 can be used for web treatment. Such a design is also conveniently associated with a steel applicator roll 31. Here, a plurality of ridges 42 are arranged to spirally extend across circumferential surface portions of the applicator roll leaving cross-sectionally triangularly shaped depressions 43 between successive ridges 42. Conveniently, this triangular-helix configuration cell structure is similar to the type of engraved structure associated with applicator rolls employed for heavy application of color and coating on machines using a doctor blade, and such rolls are likewise available from Modern Engraving and Machine Company. Such a pattern can have, for example, a maximum depth of from about 0.01 to 0.009 inch with transversed ridge widths being as described above, if desired.

Alternatively, in place of an engraved steel applicator roll 31, one can advantageously employ an applicator roll having a silicone rubber circumferential surface or an elastomeric hardened plastic surface. Such surfaces can be patterned by laser etching techniques known to the art.

Alternatively, in place of an engraved steel applicator roll 31, one can employ an applicator roll having a continuous circumferential surface. This circumferential surface is spirally wrapped (side edge to side edge abutment) with a plastic tape member formed of polyethylene terephthalate or the like. The tape member is prior to being so wrapped die-cut so as to incorporate thereinto a desired application pattern. The tape can have a thickness in the range from about 5 to 20 mils with a thickness in the range of 10 to 20 mils being presently preferred.

In the embodiment shown in FIGS. 1 and 2, as the web 23 moves over circumferential portion 32 of roll 31, the entire web 23 contacts the ridges 36 and 37 so that 100 percent of one face of the web 23 contacts circumferential facial portions of the roll 31.

Longitudinally extending across roll 31, but tranversely extending across web 23, is positioned a treater bar 46 which also is so positioned spatially as to be in a close, but vertically spaced, relationship to exposed adjacent surface portions of the web 23. Also, bar 46 is positioned so as to be in the central region of the contacting portion 32 where the web 23 contacts the circumferential surface 34 of the roll 31. The treater bar 46 is conveniently of a type which is commercially available for corona discharge treatment of plastic film, laminates, and the like when the roll 31 has a steel engraved circumferential surface 34, then a suitable treater bar 46 is of the ceramic type such as is available from the Enercon Company. When the roll 31 has a plastic surface, for example, one which is laser etched or the like, then an electronic discharge type of treater bar 46 is conveniently employed such as is available from manufacturers such as Sherman, Lepel, Pillar, and the like. As those skilled in the art appreciate, the electronic discharge device is generally less expensive than the ceramic treater device; hence, for cost reasons, one may choose when practicing the present invention to employ treater rolls which have plastic or elastomeric (rubber) circumferential faces.

The width of the corona field generated by the treater bar 46, the amount of energy associated with the corona, the extent of wrap of the web 23 about the circumferential surface 34, the traveling speed of the web 23, the design and depth of the pattern on surface 34, of roll 31, and various other process variables, as those skilled in the art will readily appreciate, can affect the extent and type of corona discharge treatment achieved in relation to a given web 23. However, because of the pattern associated with the circumferential surface 34 of roll 31 the corona discharge treatment is selective and results in a corona treated web product wherein, for example, in the case of the design configuration illustrated in FIGS. 1 and 2, the corona treatment results in the regions of web 23 which lie over individual depressions 39. The raised areas 36 and 37 contacting the web 23 result in untreated areas in web 23 which are adjacent to specifically corona treated discontinuous areas in web 23 (resulting from the web 23 having overlaid the corresponding depressed areas 43).

Thus, a web 23 which is treated by using the apparatus of FIG. 1 has a treatment pattern which corresponds, for example, approximately to the pattern or design illustrated in FIG. 4, such pattern or design being demonstratable by means of dyne measurements or the like. For example, dyne measurement can be accomplished by using the dyne measuring techniques and dyne measuring solutions available commercially from the Pillar Company of Milwaukee, Wis. Any convenient measuring technique can be employed to confirm or discern the pattern or even the existence of, treated areas in a web 23, as those skilled in the art will appreciate.

For example, the treated web 47 shown in FIG. 4 is here illustrated as a coextruded laminate of two layers identified, respectively, as layer 48 and layer 49 which are directly bonded together in the coextrusion manufacturing procedure. Any convenient composition of resin for the respective layers 48 and 49 can be employed. For example, when the treated web 47 is to be employed for cook-in meat packaging, the layer 48 can be comprised of a melt extrudable ionomer polymer, polyethylene, or the like. The ionomer polymer can be, for example, a zinc or sodium ionomer of the type which is available commercially from E.I. DuPont and DeNemours & Company under the trademark "Surlyn".

The web 47 may have a thickness in the range from about 3 to 10 mils or as desired, while the layer 49 thereof may have a thickness in the range from about 1 to 7 mils with the thickness of layer 48 being such as to achieve a desired total thickness for web 47, or as desired. Either layer 47 or layer 48 or both can be selectively treated to incorporate a treatment pattern as taught herein.

In general, web 23 can be comprised of one or more plies (layers) of polymers (plastics), as desired. Suitable polymers whose surfaces are known to display improved adherence characteristics after corona treatment are preferred, and such include polyesters, polyolefins (especially polyethylenes, and polypropylenes) polyamides, (blends of elastomers and polyolefins), and the like.

Shown in FIG. 5 is an example of a three-layer coextruded non-formable film structure designated in its entirety by the number 80 wherein the individual layers are designated respectively by the numerals 81, 82 and 83. The layer 81 is here, for example, comprised of an ionomer polymer based upon a zinc salt of ethylene/(meth)acrylic acid copolymer.

The layer 83 is here, for example, comprised of a linear low density polyethylene (LLDPE). LLDPE is available commercially from various manufacturers; for example, from the E.I. DuPont DeNemours & Company under its trademark "Sclair".

Layer 82 is here, for example, comprised of ethylene/(meth)acrylic acid copolymer (EAA or EMAA). In effect, the layer 82 serves as a tie layer between zinc ionomer layer 81 and the LLDPE layer 83. As those skilled in the art appreciate, ethylene/(meth)acrylic acid copolymers are available from various manufacturers; for example, from the E.I. DuPont DeNemours & Company under its trademark "Nucrel". In the film 80, the respective thicknesses of the individual layers 81, 82 and 83 can vary greatly without departing from the spirit and scope of the present invention.

The coextruded film 80 in the preferred practice of the present invention is initially extruded in a tube form which is then conventionally hot blown with the tubular film moving upwards in a tower using conventional equipment of the type previously employed in the art for the hot blowing of single ply polyethylene film or the like. During the hot blowing, the three layered coextruded tube is elongated and is expanded in diameter to achieve bilateral orientation.

Thereafter, the resulting blown tube is collapsed, conveniently by using nip rollers, after which the collapsed tube is slit and wound on storage rolls. Thereafter, each of the resulting sheeting or films is processed as shown and described in reference to FIG. 1 using apparatus 20. Either layer 81 or layer 83 can face towards treater bar 46 as the web moves over the application roll 31. Thereafter, the so treated and slit films is wound upon a take-up roll.

The resulting selectively treated layer 83 is particularly suitable for meat (and other highly proteinaceous material) adherency (such as turkey, beef, ham, cheese, eggs, and the like) and similarly for the treated layer 81. A present preference is to employ layer 83 for turkey (deboned or the like) and to employ layer 81 for ham. A layer 80 has a capacity to heat shrink at cooking temperatures (typically ranging from about 185° to 200° F.).

To prepare a formable web structure using the selectively treated film 80, a preformed layer 84 comprised of, for example, a cast selected polyamide having low crystallinity and a highly amorphous structure is obtained. Such polyamide films are available commercially, and a present preference is to employ a polyamide film available commercially from the E.I. DuPont of Canada under its trade designation "EN 972" or Allied Chemicals' polyamide no. 15 39. Preferably, the layer 84 ranges in thickness from about 2 to 6 mils although thinner and thicker films can be employed if desired. The layer 84 has a capacity to heat shrink at cooking temperatures (typically ranging from about 185° to 200° F.).

To bond the film 84 to either face of the film 80 a layer of adhesive is used between film 84 and film 80. One suitable adhesive is a polyester adhesive, such as is available commercially under the trade designation "56065" from E.I. DuPont DeNemours & Company.

In the embodiment of a formable web as shown in FIG. 6 and designated in its entirety by the numeral 86, the layer 81 is thus bonded to one side of the film 84 through an adhesive layer 87. Conveniently, the polyester adhesive is applied as a solution or dispersion in combination with a liquid carrier to either the polyamide layer 84 or to one of the layers 81 or 83 after which the liquid carrier is preferably evaporated to leave a thin layer of polyester adhesive. Thereafter, the respective layers are brought together into a composite laminate with the aid of heat and pressure to achieve the desired formable web structure 86. Such a web 86 has a total thickness which is greater than about 4 mils and less than about 11 mils.

To provide a laminate structure suitable for use as a nonformable lid material, a web 88 such as exemplified in FIG. 13 is provided. The web structure 88 incorporates three layers, an outer layer 89, an inner layer 91, and an intermediate layer 92. In the embodiment shown, the outer layer 89 is preferably comprised of a polyamide which is similar in polymer structure and in physical properties to the polyamide comprising the film 84. The intermediate layer 92 is a polyester adhesive which is preferably similar in function and in composition to the polyester adhesive employed in the previously described layer 87.

The inner layer 91 is comprised either of a zinc ionomer similar to that employed in the layer 81 above-described, or is a linear low density polyethylene which is similar to that abovedescribed in reference to the layer 83. When layer 83 is exposed and is thus adapted to comprise the inner face of a formable web structure such as structure 86, then the layer 91 is an LLDPE which preferably matches the composition of the LLDPE employed in the layer 83. When, however, the layer 81 is the interior face of a formable web structure (not shown) wherein the layers 81 and 83 are reversed relative to their positions shown in FIG. 6, then the layer 92 is comprised of a zinc ionomer whose composition is preferably comparable to that of the zinc ionomer employed in the layer 81.

A formable web such as 86 is conveniently manufactured in a roll form and in this form is conveniently supplied to cook-in meat processors or the like. Such users form their own trays, such as tray 93 from a web 86, or the like, with the forming being caused but so as to make the inside surfaces of the tray be comprised of a selectively treated layer 81 or 83 as the case may be, depending upon the structures used in the formable web. In the forming operation, the former typically employs his own forming equipment and procedures. Typically and preferably, the forming equipment and the forming conditions involved in tray production utilize low temperatures, that is, temperatures that are usually well below the normal thermoforming temperatures known to the thermoforming art, but such temperatures are nevertheless elevated to a level which is high enough to soften and to permit some stretching of the web structure 86. The forming equipment is typically and preferably that of the type known in the art as "plug assist" thermoforming equipment. After formation of the tray 93, or the like, the tray is separated from the molding or forming apparatus, is rapidly cooled, and is ready for filling and sealing with meat or other highly proteinaceous material. Thereafter, a tray 93 is filled with a highly proteinaceous material, and sealed with a web 88. During the forming operation, the web 86 is in effect stretched as a part of the forming operation. The overall procedure is commonly termed in the trade "cold forming".

The side of the web 88 which is sealed to the rim of tray 93 is selectively treated in accord with the present invention as shown in FIG. 1 and described above.

Thus, regardless of whether the inner layer 91 is comprised of a zinc ionomer or an LLDPE, such layer is prepared as an extruded tube which is hot blown and which is then thereafter exposed to corona discharge treatment in the presence of a patterned roller using apparatus in the general configuration as illustrated, for example in FIG. 1, thereby to produce a film 91 which bears a pattern which in the present embodiment is preferably similar to or even identical to the pattern associated with the exposed outer surface of the film 80 in the laminate 86, as those skilled in the art will appreciate.

A tray such as tray 93 when subsequently heated to cooking temperatures for cooking times tends to shrink or "snap back" substantially, the maximum achievable amount of dimensional shrinkage at such temperatures being determined by many variables including the extent of stretching accomplished in tray formation, tray size and configuration, and other variables, as those skilled in the art will appreciate. It is this capacity for heat shrinkage of the tray 93, combined with the capacity of the interior wall portions of the tray 93 to adhere to meat (or other highly proteinaceous material) cooked therein, which primarily permit achievement of the cook-in of formed, filled and sealed containers, such as the container 94 as shown in FIG. 7 that is heat sealed with the lid material 88, without purge or loss of juices during cook-in.

Thus, when, for example, meat (or other highly proteinaceous material) is filled into a container 94 and is sealed thereinto and cooked therein, as described, there results a well sealed cook-in product which is substantially free from purge. Also, because of the pattern configuration associated with the inside wall portions of the container 94, no objectionable loss of meat through adherence of heat to inside wall portions of the container 94 results when the meat is removed and separated from the container 94.

FIGS. 9, 10 and 11 illustrate non-formable containers identified respectively by the numerals 96, 97 and 98 which are formed from film or web structures which have been processed in accordance with the present invention, such generally having thicknesses less than about 4 mils.

Container 96 is in the nature of a casing whose inside wall portions are comprised of a layer which has been selectively treated in accordance with the present invention. The casing 96 is shown in its stuffed and sealed form with the fill thereof being a highly proteinaceous food material such as sausage, ham, poultry, or the like. Typically, the container 96 is sealed at its opposing ends and the seal is augmented with a tie ring 99 or the like. Although single ply plastic materials such as polyethylene can be employed in the casing 96, multiply structures can be used if desired, as those skilled in the art will appreciate. A presently preferred singly ply material is a polyethylene which has been extruded, blown in hot tube form, then processed in a collapsed form using apparatus 20 (FIG. 1).

The container 97 is here illustrated to be one of the type which is conventionally produced by conventional form and fill apparatus. Plastic film or web materials similar to those employed in the container 96 may be employed although it is preferred to employ in a container 97 materials having a somewhat greater heat shrink capability during cook-in operations.

The container structure 98 has a C-configuration with a side mouth. Such container 98 is adapted for preliminary fabrication followed by intermediate storage before filling. For example, the container 98 can be fabricated by a container manufacturer and then shipped to a food processor for filling, sealing and cook-in. Preferably the container 98 has heat shrink characteristics comparable to those associated with a container such as 97.

As is apparent from the foregoing specification, the invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

I claim:

1. A container for cook-in of proteinaceous material having inside wall surfaces comprised of a proteinaceous material adherent layer of a plastic material which has been selectively subjected to a corona discharge treatment in first areas thereof and said inside wall surfaces having second areas which have not been subjected to a corona discharge said first and second areas are formed in a repeating pattern:
    (a) to permit improved sealing capacity between said inside wall surfaces,
    (b) to cause proteinaceous material cooked in contact therewith selectively to adhere to such treated first areas, and
    (c) to facilitate release of such inside wall surfaces from proteinaceous material which has been cooked in said container with minimum separation of portions of said proteinaceous material from the proteinaceous material as a whole in said container.

2. The container of claim 1 filled with a proteinaceous material and sealed.

3. The container of claim 2 wherein said proteinaceous material has been cooked in said container.

4. A method for enhancing yield of cook-in packaged proteinaceous material comprising the steps of:
    (a) filling a cook-in container with a proteinaceous material to be cooked, said container being conformable about said proteinaceous material, said container having inner surfaces which adhere to said proteinaceous material during cooking, and said inner surfaces having first areas which have been treated by corona treated areas, and second areas which have not been treated by corona discharge, said first and second areas formed in a repeating pattern,
    (b) conforming said container about said proteinaceous material and sealing said container, thereby to provide a packaged product,
    (c) cooking said packaged product whereupon said proteinaceous material adheres to said first areas of said inner surface, and
    (d) removing said container from the resulting cooked meat whereupon substantially all of said cooked proteinaceous material is released from said inner surface.

5. The method of claim 4 wherein said container is heat shrinkable.

* * * * *